US011277425B2

(12) United States Patent
Kulkarni et al.

(10) Patent No.: US 11,277,425 B2
(45) Date of Patent: Mar. 15, 2022

(54) ANOMALY AND MODE INFERENCE FROM TIME SERIES DATA

(71) Applicant: International Business Machines Corporation, Armonk, NY (US)

(72) Inventors: Kedar Kulkarni, Bangalore (IN); Padmanabha V. Seshadri, Bangalore (IN); Satyam Dwivedi, Bangalore (IN); Amith Singhee, Bangalore (IN); Pankaj S. Dayama, Bangalore (IN); Nitin Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 16/385,457

(22) Filed: Apr. 16, 2019

(65) Prior Publication Data
US 2020/0336499 A1  Oct. 22, 2020

(51) Int. Cl.
*G06F 11/00* (2006.01)
*H04L 29/06* (2006.01)
(Continued)

(52) U.S. Cl.
CPC ...... *H04L 63/1425* (2013.01); *G06F 16/9024* (2019.01); *G06F 17/18* (2013.01);
(Continued)

(58) Field of Classification Search
CPC ..... H04L 63/1425; H04L 41/22; H04L 63/20; H04L 2463/121; H04L 63/1433;
(Continued)

(56) References Cited

U.S. PATENT DOCUMENTS 7,191,073 B2   3/2007  Astley et al.
7,639,714 B2  12/2009  Stolfo et al.
(Continued)

OTHER PUBLICATIONS

Zhang, C. et al., A Deep Neural Network for Unsupervised Anomaly Detection and Diagnosis in Multivariate Time Series Data, arXiv preprint arXiv:1811.08055, Nov. 20, 2018.
(Continued)

*Primary Examiner* — Lizbeth Torres-Diaz
(74) *Attorney, Agent, or Firm* — Ryan, Mason & Lewis, LLP

(57) ABSTRACT

Methods, systems, and computer program products for anomaly and mode inference from time series data are provided herein. A computer-implemented method includes receiving time-series sensor data for each one of a group of devices; extracting a set of states for each device in the group from the time-series sensor data; constructing a state-transition graph for each of the devices, wherein each of the state-transition graphs comprises nodes corresponding to each state in the set and edges corresponding to a probability of transition between the extracted states over time; identifying, for each set, a given state as one of: a mode, a normal state and an anomalous state based on the state-transition graph; and detecting one or more anomalous devices in the group by computing similarities between different devices in the group, based at least in part on the determined state-transition graphs.

20 Claims, 9 Drawing Sheets

(51) Int. Cl.
  *G06F 16/901*  (2019.01)
  *G06N 5/04*  (2006.01)
  *G06K 9/62*  (2022.01)
  *G06F 17/18*  (2006.01)
(52) U.S. Cl.
  CPC .......... *G06K 9/6215* (2013.01); *G06K 9/6218* (2013.01); *G06N 5/04* (2013.01)
(58) Field of Classification Search
  CPC ..... H04L 43/08; H04L 41/142; G06F 16/285; G06F 16/9024; G06F 11/0709; G06F 17/18; G06F 2221/033
  See application file for complete search history.

(56) References Cited

U.S. PATENT DOCUMENTS

| | | | |
|---|---|---|---|
| 7,853,433 | B2 | 12/2010 | He et al. |
| 9,075,713 | B2 | 7/2015 | Jones et al. |
| 9,218,232 | B2 | 12/2015 | Khalastchi et al. |
| 9,727,821 | B2 | 8/2017 | Lin et al. |
| 9,787,705 | B1* | 10/2017 | Love ................... G06F 16/9024 |
| 10,587,633 | B2* | 3/2020 | Muddu ................. G06F 16/285 |
| 2012/0041575 | A1 | 2/2012 | Maeda et al. |
| 2013/0282336 | A1 | 10/2013 | Maeda et al. |
| 2014/0172866 | A1 | 6/2014 | Lin et al. |
| 2016/0117502 | A1* | 4/2016 | Reed ..................... G06F 1/3206 726/23 |
| 2017/0028593 | A1 | 2/2017 | Maruyama |
| 2017/0284896 | A1 | 8/2017 | Harpale et al. |
| 2018/0219888 | A1* | 8/2018 | Apostolopoulos .......................... H04L 63/1425 |
| 2018/0220314 | A1 | 8/2018 | Chen et al. |
| 2018/0367551 | A1* | 12/2018 | Muddu ................ G06F 40/134 |
| 2019/0095266 | A1* | 3/2019 | Chen ...................... G06N 5/022 |
| 2019/0243872 | A1* | 8/2019 | Komatsu ............ G06K 9/00523 |
| 2019/0310635 | A1* | 10/2019 | Hazard ................... G06F 17/18 |
| 2019/0312898 | A1 | 10/2019 | Verma et al. |
| 2020/0005096 | A1* | 1/2020 | Calmon ............... G06K 9/6218 |
| 2020/0082013 | A1* | 3/2020 | Triplet .................... G06N 20/00 |
| 2020/0099709 | A1* | 3/2020 | Vasseur ................. H04L 41/065 |
| 2020/0120122 | A1 | 4/2020 | Du et al. |
| 2020/0162503 | A1* | 5/2020 | Shurtleff ............. H04L 41/0883 |
| 2020/0167787 | A1* | 5/2020 | Kursun ............... G06F 16/9024 |
| 2020/0204576 | A1 | 6/2020 | Davis et al. |
| 2020/0285997 | A1* | 9/2020 | Bhattacharyya ....... G06N 20/00 |
| 2020/0287914 | A1* | 9/2020 | Swanson ............... G06F 21/554 |
| 2020/0336499 | A1* | 10/2020 | Kulkarni ............. H04L 63/1425 |
| 2020/0380129 | A1* | 12/2020 | Dawson ............... G06F 21/567 |
| 2021/0049477 | A1* | 2/2021 | Sakae ..................... G06F 9/544 |
| 2021/0124983 | A1* | 4/2021 | Axenie ................ G06K 9/6263 |

OTHER PUBLICATIONS

Urosevic, V. et al., Temporal clustering for behavior variation and anomaly detection from data acquired through IoT in smart cities, Recent Applications in Data Clustering. IntechOpen, Aug. 1, 2018.
List of IBM Patents or Patent Applications Treated as Related, dated Jul. 31, 2019.
A Textual Transform of Multivariate Time-Series for Prognostics; Abhay Harpale et al.; arXiv.org; Sep. 19, 2017; Cornell University Library.
Towards Adaptive Anomaly Detection and Root Cause Analysis by Automated Extraction of Knowledge from Risk Analyses.
"Discovering anomalous events from urban informatics data." In Ground/Air Multisensor Interoperability, Integration, and Networking for Persistent ISR VIII, vol. 10190, p. 101900F. International Society for Optics and Photonics, 2017.
Multi-task Multi-modal Models for Collective Anomaly Detection.
Change Detection Using Directional Statistics. In IJCAI, pp. 1613-1619. 2016.
"Unsupervised real-time anomaly detection for streaming data."
Cityprophet: City-scale irregularity prediction using transit app logs. In Proceedings of the 2016 ACM International Joint Conference on Pervasive and Ubiquitous Computing, pp. 752-757. ACM, 2016.
Sensegen: A deep learning architecture for synthetic sensor data generation. In Pervasive Computing and Communications Workshops (PerCom Workshops), 2017 IEEE International Conference on, pp. 188-193. IEEE, 2017.
Harpale, Abhay et al., A Textual Transform of Multivariate Time-Series for Prognostics; arXiv:1709.06669; Cornell University Library; Sep. 19, 2017.
Steemwinckel, Bram et al., Towards Adaptive Anomaly Detection and Root Cause Analysis by Automated Extraction of Knowledge from Risk Analyses, Proceedings of the 9th International Semantic Sensor Networks Workshop co-located with 17th International Semantic Web Conference (ISWC 2018), Monterey, CA, United States, Oct. 9, 2018.
Jayarajah, Kasthuri et al., Discovering anomalous events from urban informatics data, Proceedings of SPIE: 8th Ground/Air Multisensor Interoperability, Integration, and Networking for Persistent ISR, 10190, Anaheim, United States, Apr. 10-13, 2017.
Idé, Tsuyoshi et al., Multi-task Multi-modal Models for Collective Anomaly Detection, 2017 IEEE International Conference on Data Mining (ICDM), New Orleans, LA, 2017, Nov. 18-21, 2017, pp. 177-186.
Idé, Tsuyoshi et al.; Change detection using directional statistics, In Proceedings of the Twenty-Fifth International Joint Conference on Artificial Intelligence (IJCAI'16), Gerhard Brewka (Ed.). AAAI Press, Jul. 9, 2016.
Ahmad, Subutai et al., Unsupervised Real-Time Anomaly Detection for Streaming Data, Neurocomputing, vol. 262, Jun. 2, 2017, pp. 134-147, ISSN 0925-2312.
Konishi,, Tatsuya et al., CityProphet: city-scale irregularity prediction using transit app logs. In Proceedings of the 2016 ACM International Joint Conference on Pervasive and Ubiquitous Computing (UbiComp '16). ACM, New York, NY, USA, Sep. 12, 2016, pp. 752-757.
Alzantot, Moustafa et al., Sensegen: A deep learning architecture for synthetic sensor data generation, In 2017 IEEE International Conference on Pervasive Computing and Communications Workshops (PerCom Workshops), pp. 188-193. IEEE, 2017.
Giridhar, Prasanna et al., ClariSense+: An enhanced traffic anomaly explanation service using social network feeds, Pervasive and Mobile Computing, vol. 33, Dec. 2016 (available online Apr. 6, 2016), pp. 140-155, ISSN 1574-1192.

* cited by examiner

ANOMALY AND MODE INFERENCE FROM TIME SERIES DATA

FIELD

The present application generally relates to information technology and, more particularly, to detecting anomalies across assets based on time-series data.

BACKGROUND

Internet of things (IoT) refers to a network of devices that include, for example, electronics, software, sensors, actuators and connectivity which allows these things to connect, interact and exchange data. There are an increasing number of applications of IoT in consumer, commercial, industrial and infrastructure spaces. IoT applications will often rely on many assets (for example, sensor devices) and it is often difficult to detect anomalies across such assets, thereby leading to increased costs to remediate such anomalies and inefficiencies in the IoT system.

SUMMARY

In one embodiment of the present invention, techniques for anomaly and mode inference from time series data are provided. An exemplary computer-implemented method includes steps of receiving time-series sensor data for each one of a group of devices and extracting a set of states for each device in the group from the time-series sensor data. The method also includes constructing a state-transition graph for each of the devices, wherein each of the state-transition graphs comprises (i) nodes corresponding to each state in the set and (ii) edges corresponding to a probability of transition between the extracted states over time. The method further includes identifying, for each set, a given state as one of: a mode, a normal state and an anomalous state based on the state-transition graph. Additionally, the method includes detecting one or more anomalous devices in the group by computing similarities between different devices in the group, based at least in part on the determined state-transition graphs.

In another embodiment of the invention, an exemplary computer-implemented method include steps of performing intra-asset anomaly detection for a group of devices based on sensor data related to each device in the group, wherein said performing intra-asset anomaly detection for a given device comprises (i) extracting one or more states for the given device from the sensor data and (ii) identifying each of the extracted states as being one of (a) a mode, (b) a normal state and (c) an anomalous state based at least in part on state transition probabilities from a state-transition matrix for the given device, wherein the state-transition matrix is determined based at least in part on the sensor data. The method also includes performing unsupervised inter-asset anomaly detection for the group of devices, wherein said inter-asset anomaly detection comprises detecting anomalous devices in the group based at least in part on a comparison of the state-transition matrices determined for each of the devices.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Detecting anomalies across multiple assets presents a number of challenges. For example, one challenge is extracting different modes from the IoT data in an unsupervised manner. In general, there is no available way to meaningfully label different modes. A generalized definition of a mode is needed so that it can be applied to the data. The definition should work across domains and generalize across assets represented within a dataset. Additionally, multiple modes with different characteristics may exist in any complex process/system. Isolating and differentiating between modes from multivariate time series without ambiguity is a challenge. Another challenge is detecting anomalous states in comparison to normal modes.

Yet another challenge includes propagating mode-level (intra-asset) anomalies to asset level in order to identify anomalous assets. This is difficult because an intra-asset anomalous mode does not necessarily imply an asset is anomalous. Further, commonly, data are incomplete due to, for example, sensor failures, data acquisition/communication failures, etc. These issues may lead to gaps in time-series which need to be meaningfully handled in order for anomalies to be detected in an efficient and accurate manner.

The exemplary embodiments herein describe techniques for detecting anomaly and mode inference from time series data. At least one or more of the example embodiments described herein allow anomalies to be detected across multiple assets (for example, multiple IoT devices). Additionally, one or more example embodiments allow rapid unsupervised multi-modal time-series anomaly detection across multiple assets even in the presence of data gaps.

According to one or more embodiments of the subject matter described herein, intra-asset anomaly detection is performed by applying a domain-agnostic definition of mode and anomalous state to individual assets based on state-transitions. Inter-asset anomaly detection is then performed by comparing the assets using various methods (such as, for example, state-transition matrix and Dunn-index profiles) which capture the spatio-temporal characteristics of the time-series data segments. Also, in some example embodiments, asset relationships are leveraged to infer the propensity of anomaly in assets under conditions of incomplete data using a dynamic knowledge graph.

Figure 1:
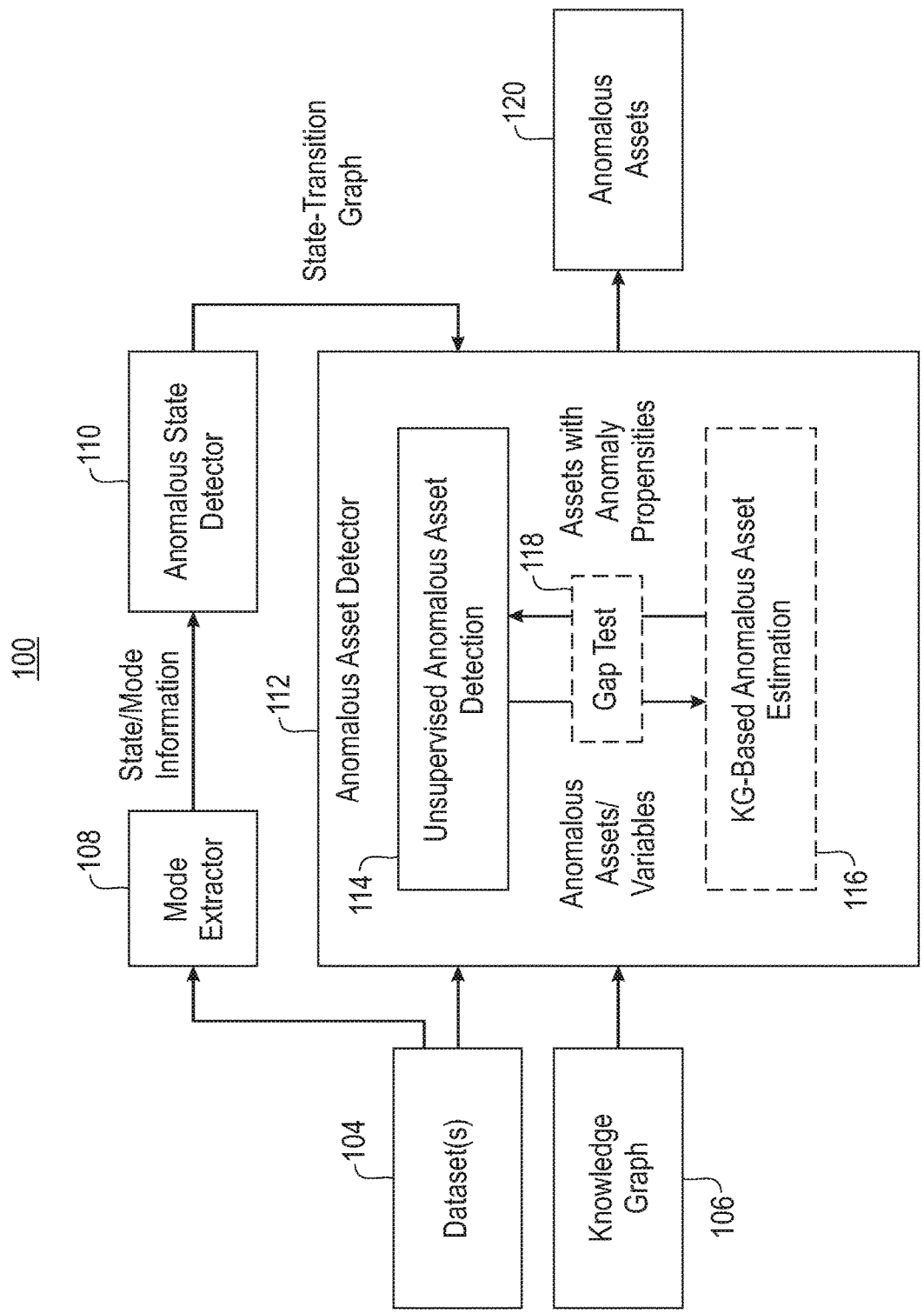
FIG. 1 is a diagram illustrating system architecture, according to an exemplary embodiment of the invention.

FIG. 1 is a diagram illustrating a system architecture 100 according to one example embodiment of the subject matter described herein. By way of illustration, system architecture 100 includes a mode extractor 108, anomalous state detector 110, and an anomalous asset detector 112. Additionally, the example in FIG. 1 shows input in the form of one or more datasets 104 and a knowledge graph 106, and output in the form of a list of assets 120.

The datasets 104 may be, for example, multivariate time-series datasets (MTD) which include time-series data for different assets (for example, IoT sensor data). As an example, an MTD may include timestamped rows having different fields, wherein each field is a sensor variable. Also, in some example embodiments the datasets 104 may include at least one univariate dataset.

The mode extractor 108 receives the one or more datasets 104 as input. For each dataset 104, the mode extractor 108 segments the data, fits a distribution to each segment, and uses the distribution to compute a similarity between the segments. The mode extractor 108 performs unsupervised clustering to generate a state-transition graph, wherein each cluster represents a different state. The mode extractor 108 identifies states as being modes by thresholding the round-trip probabilities of cycles in the state-transition graph to which a given state belongs. As a non-limiting example, the mode extractor 108 may include performing a mode extraction process that includes the following steps:

1) Each of the one or more datasets 104 is segmented using, for example, a time-series segmentation techniques to create segments (such as, time-based (e.g., clustering over time) and/or variable value-based clustering, for example).
2) Each segment is fitted with a multivariate Gaussian distribution to obtain a mean-vector and a co-variance matrix. The covariance matrix may be retrieved, for example, using methods such as empirical co-variance estimation, graphical lasso, etc.
3) The segments from each dataset are compared by computing the J-Coefficient J(.) and applying a distance function d(J(i,j)) to obtain a M×M distance matrix (DM), wherein M is the number of segments and each entry (i, j) in the matrix is the value distance function on J-coefficient for the distributions for segments i and j. The distance function may be defined as follows:

$$d(J(i, j)) = e^{-\left(\frac{J(i,j)}{k}\right)}$$

where k is a constant. It is to be appreciated that other metrics may also be used in place of the J-Coefficient, such as KL-divergence, for example.

4) Unsupervised graph clustering is applied on the distance matrix to obtain a set of clusters. Non-limiting examples of unsupervised clustering techniques for clustering segments of the time-series dataset include, for example, spin-glass, hierarchical and PAM clustering.
5) Each cluster from step 4) is represented as a state in the state-transition graph. The edges of the state-transition graph are labeled with the transition probabilities of transition of time-series values between states (clusters) over time. A state i is labeled as a "mode" if the probability $p_{i \to i}$ is greater than a configurable threshold $\tau$. The probability $p_{i \to i}$ is the sum of all round-trip probabilities (i.e., the product of the edge probabilities) of all cycles $\mathbb{C}_i$ to which state i belongs, as indicated by the following equation:

$$p_{i \to i} = \sum_{c \in \mathbb{C}_i} \Pi_{j=0}^{|c|} p_{c[j], c[j+1]}$$

wherein c[j] is the $j^{th}$ element in the sequence of states constituting the cycle c.

Figure 2:
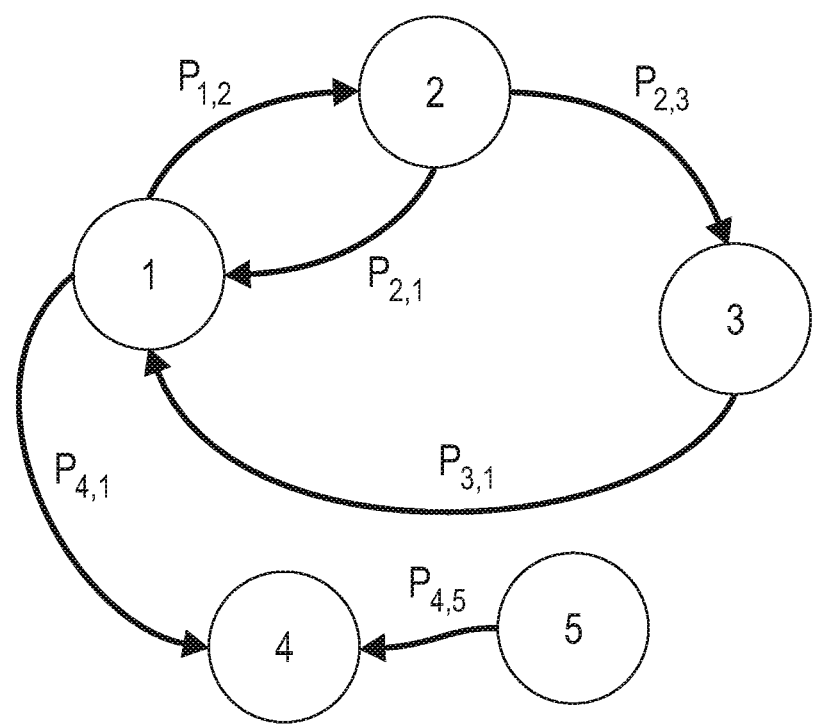
FIG. 2 is an example of a state-transition graph in accordance with one or more example embodiments.

Referring also to FIG. 2, this figure shows an example of a state-transition graph 200 in accordance with example embodiments. The state-transition graph 200 includes five nodes that are labeled 1-5. In this example, states 4 and 5 are not part of a cycle, thus $p_{i \to i} = 0$. On the other hand, state 1 is part of two cycles (i.e., <1, 2, 1> and <1, 2, 3, 1>), state 2 is part of two cycles (i.e., <2, 1, 2> and <2, 3, 1, 2>) and state 3 is part of one cycle (i.e., <3, 1, 2, 3>). The expressions for $p_{i \to i}$ for state-transition graph 200 are as follows:

$$p_{1 \to 1} = p_{1,2} \times p_{2,1} + p_{1,2} \times p_{2,3} \times p_{3,1}$$

$$p_{2 \to 2} = p_{1,2} \times p_{2,1} + p_{2,3} \times p_{3,1} \times p_{1,2}$$

$$p_{3 \to 3} = p_{3,1} \times p_{1,2} \times p_{2,3}$$

Referring again to FIG. 1, the mode extractor 108 outputs the mode information to the anomalous state detector 110, wherein the mode information comprises the extracted modes and the remaining states.

The anomalous state detector 110 attempts to determine whether each of the remaining states (i.e., those not labeled modes) is a normal state or an anomalous state. In at least one example embodiment, a state, i, is determined to be a normal state when the round-trip probability $p_{i \to i} < \tau$, but the self-transition probability $p_{i,i} > \rho$, where $\rho$ is a configurable threshold. Otherwise, the state is identified as an anomalous state.

The state-transition graph for each asset is then passed to the anomalous asset detector 112. According to one or more example embodiments, the anomalous asset detector 112 detects anomalous assets by applying an unsupervised anomalous asset detection 114 technique. The anomalous assets and the propensities are then output to, for example, a user.

The unsupervised anomalous asset detection 114 builds an asset similarity graph by leveraging state properties. Building the asset similarity graph may include computing asset similarities using the state-transition matrices of assets, building an asset-graph which includes the assets as vertices and the edge weights (corresponding to the computed similarities) of the corresponding assets and performing unsupervised graph clustering to identify the clusters of assets (for example, in a similar manner as described above for the different segments). The clusters may then be used to identify anomalous assets (for example, in a similar manner to the techniques used by the mode extractor 108 and anomalous state detector 110).

The similarities between assets may be computed based on one or more of the following metrics: KL-Divergence, Dunn-index profiles and matrix norms. For example, a state-transition matrix P for each of the assets is determined based on the state-transition graph from the anomalous state detector 110. Assuming a steady state behavior and Markov property, the steady-state probabilities of each of the states is computed using the equation $\pi P = \pi$. Let $\pi_i$ and $\pi_j$ be the steady-state probability vector for asset i and j respectively, then the KL-divergence for this pair is given as:

$$D_{KL}(\pi_i \| \pi_j) = \sum_k \pi_i(k) \times \log \frac{\pi_i(k)}{\pi_j(k)}$$

One of the matrix norms (such as, Frobenius norm, for example) may also be used to compute the difference between the state-transition matrices of an asset pair. For example, the distance metric with the Frobenius norm may be represented as:

$$\|P_i - P_j\| = \Sigma\Sigma(|p_{a,b}{}^i - p_{a,b}{}^j|)^2$$

According to some embodiments, for different numbers of clusters, clustering is performed for each asset and a profile with the format of <cluster-size, Dunn-index> is created. Assets are compared by computing similarity between such profiles. It is to be appreciated that other similarity metrics may also be used, such as, Pearson co-efficient, cosine-similarity, etc. According to at least some embodiments, multiple metrics may be computed, and the smallest metric value may be used. For example, the smallest metric value may indicate "stand-out" assets which are different from other assets on all the metric options. Such assets tend to be anomalous.

If gaps exist in the datasets 104 of one or more assets, then it is possible that these assets will not be properly identified, for example, by the anomalous state detector 110 and anomalous asset detector 112. In at least one example embodiment, an indirect inference mechanism is used to estimate the propensity of anomalous behavior for an asset with incomplete data, given the assets which already have been marked anomalous. More particularly, a gap test 118 is performed on data frames of assets using pre-defined rules (such as, for example, thresholds, percentage limits etc.) such as, for example, the number of samples in the data frame, frequency of samples in data frame, etc. If an asset fails the gap test 118, then KG-based anomalous asset estimation 116 is applied to that asset based on the knowledge graph 106.

Figure 3:
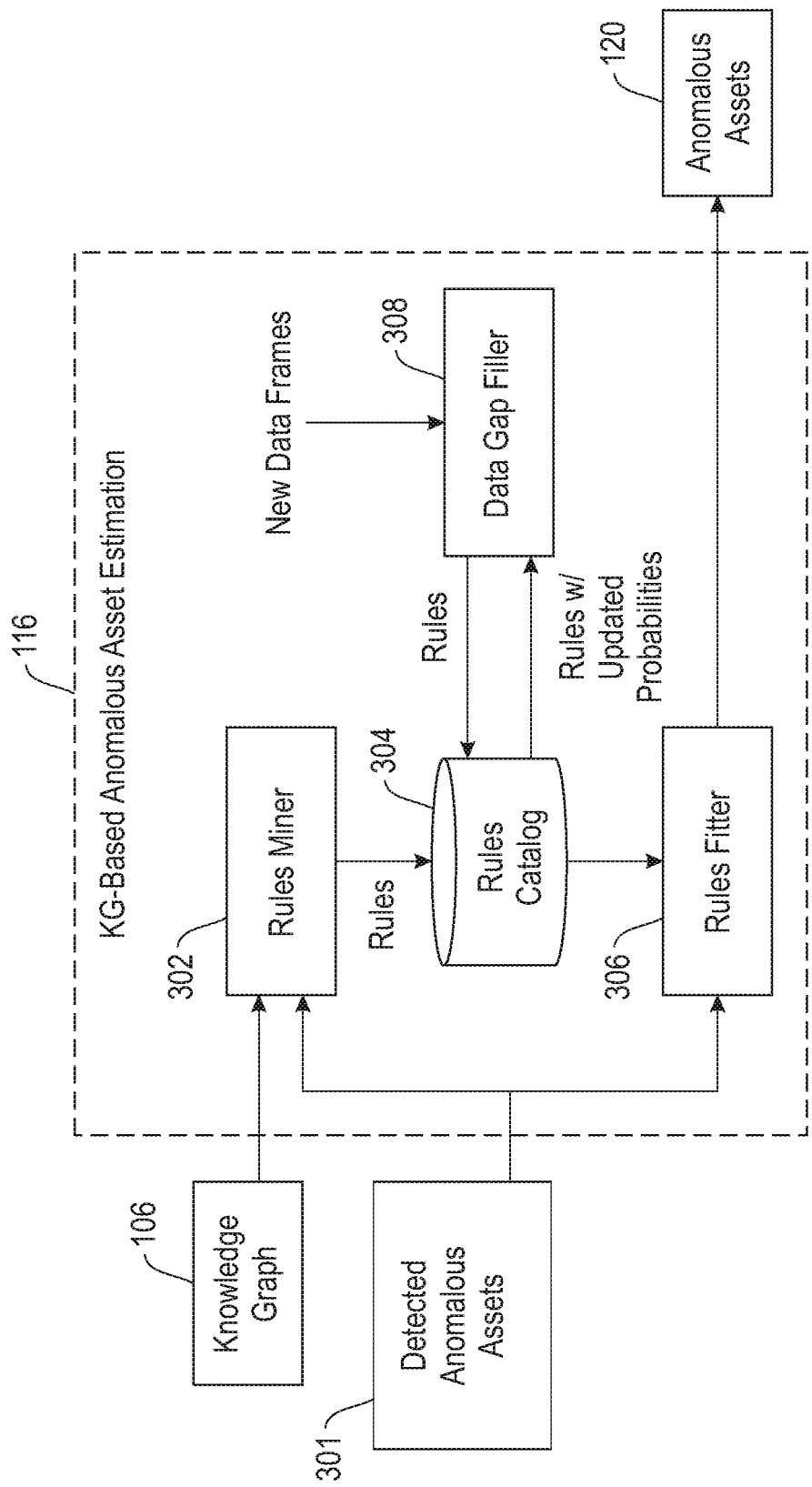
FIG. 3 is a flow-diagram for KG-based anomalous asset estimation in accordance with one or more example embodiments.

Referring also to FIG. 3, this figure shows a high-level flow diagram for KG-based anomalous asset estimation in accordance with an example embodiment. As shown in FIG. 3, at least some of the operations correspond to operations performed by KG-based anomalous asset estimation 116, for example. The flow-diagram includes a rule miner 302, a rules catalog 304, a rules fitter 306 and a data gap filler 308. The rules miner 302 receives previously detected anomalous assets 301 (for example, from the unsupervised anomalous asset detection 114) and the knowledge graph 106, computes the associated rule probabilities with the available data and stores the rules in the rules catalog 304. Whenever new data frames are available, data gaps are filled by the data gap filler 308, and the rule probabilities in the rules catalog 304 are updated. Whenever anomalous assets are detected, the rules from the rules catalog 304 are applied by the rules fitter 306 to estimate if any other assets have a propensity towards anomaly, wherein the rule probability is the measure of propensity.

For example, the rule miner 302 may perform a neighborhood analysis to generate rules in the following example format: <Boolean Expression E>→<Inference I>::p(I|E). An example of a rule is anomaly($A_1$)∧relationship($A_1$, $A_2$)→anomaly($A_2$)::p(I|E), which means that given $A_1$ (which is expected to have enough anomalous cases to establish a historical trend) and its (n-hop) neighbor $A_2$, if $A_1$ is anomalous then $A_2$ is anomalous with probability p(I|E), wherein E is the Boolean expression and I is the inferred event. This probability is the propensity metric (since $A_2$ is already marked as anomalous, the propensity metric for $A_1$ is 1) for $A_2$:

$$p(I \mid E) = \frac{n(E \cap I)}{n(E)}$$

If $A_2$ also has sufficient data frames (from historical logs, for example) which contain anomalous instances, then the computation of n(E∩I) is straightforward. However, if $A_2$ has gaps, especially in data frames containing anomalies, synthetic data are used to fill the gaps in the data of $A_2$ before estimating n(E∩I).

The data gap filler 308 includes a transform learning process which uses the knowledge graph 106 as input. According to at least one example embodiment, the transform learning process includes using the knowledge graph to identify a list of assets, $A_i$, that are similar to $A_2$. The list of $A_i$ may be filtered based on the richness of historical data, for example, a proportion of anomalous data frames to normal data frames. For each filtered pair ($A_i$, $A_2$), a transformation function is learned which transforms a data frame of $A_i$ into a data frame of $A_2$. It is assumed that only gaps in anomalous data of $A_2$ are likely to make $A_2$ undetectable and that $A_2$ is likely to include a fair share of normal frames without any gaps to facilitate the transform learning process. In one or more embodiments, the transformation functions correspond to radial basis functions.

According to some example embodiments, when multiple $A_i$ similar to $A_2$ exist, a consensus protocol (for example, voting, weighted average etc.) is applied to determine the synthesized $A_2$ frame for a given time. The error terms for the transforms with respect to each $A_i$ are then corrected using the synthesized $A_2$ frame.

Figure 4A:
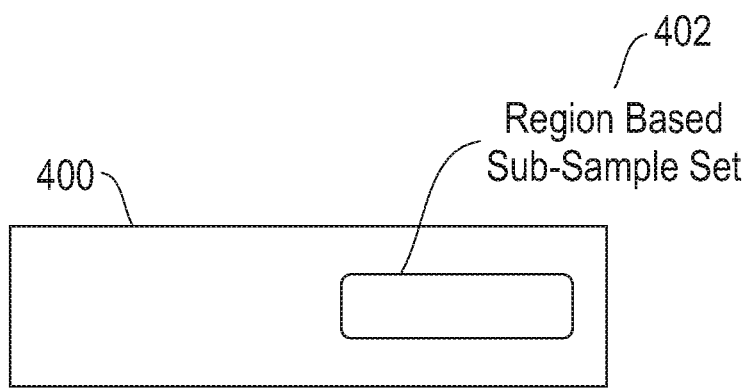
FIGS. 4A-4C are example data frames in accordance with example embodiments.

For a given $A_i$, there might not be sufficient variants of data frames to detect an anomaly condition. Thus, in some example embodiments, the data gap filler 308 applies a mutation protocol to an anchor data frame (i.e., a known anomalous data frame) to create one or more variants. For example, the variant synthesis process may include sub-sampling an anchor data frame to determine region based sub-sample sets. An example of a region based sub-sample set 402 for anchor data frame 400 is shown in FIG. 4A. It is noted that the sub-sampling could also be uniformly distributed or could be focused in specific region of the anchor data frame.

Figure 4B:
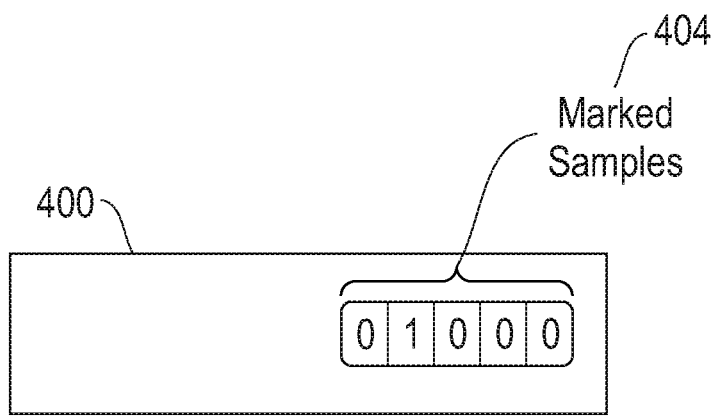

Each sample in each of the sub-sampled sets may be marked as either contributing to the anomaly or not contributing to the anomaly. For example, FIG. 4B shows marked samples 404 in the sub-sample set 402 in accordance with example embodiments. In the example shown in FIG. 4B, a sample marked with '1' indicates the sample contributes to the anomaly and a sample marked with '0' indicate the sample does not contribute to the anomaly.

Figure 4C:
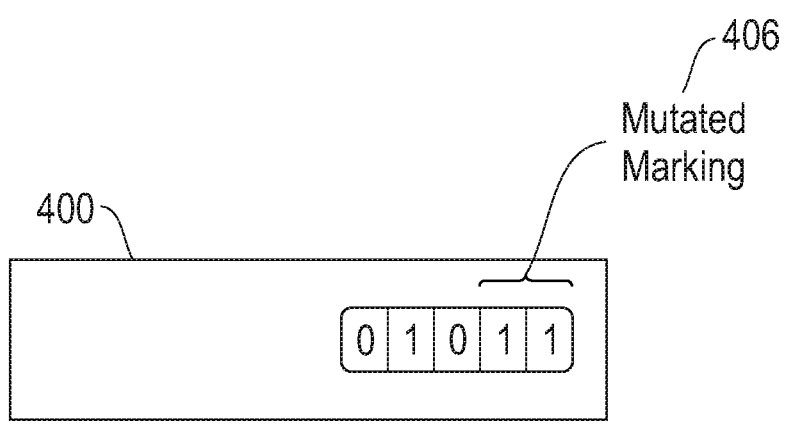

A sub-sampled sequence is randomly selected from the sub-sample set and the labels are flipped based on a probability distribution. The mutated sub-sample sequence is then merged with the original anchor data frame to create the variant dataset. For example, in FIG. 4C, the mutated marking 406 includes the last two samples in the sub-sample set 402 which are changed from '00' to '11'.

The variant dataset is then tested as to whether it contains an anomaly. For example, the variant dataset may be tested using mode extractor 108, anomalous state detector 110 and unsupervised anomalous asset detection 114. If an anomaly is not detected, the mutation is discarded and the variant synthesis process steps are repeated.

Figure 5:
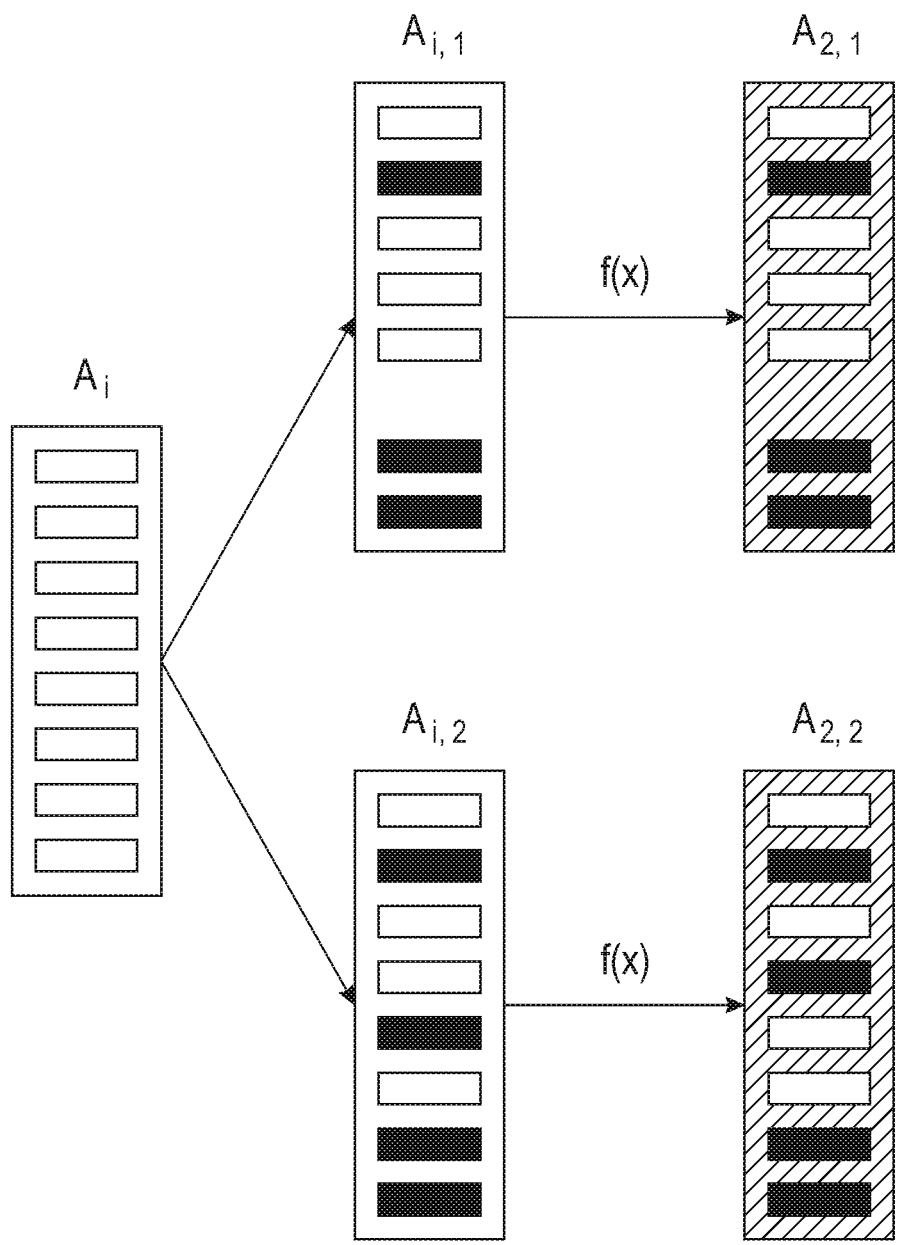
FIG. 5 is a diagram illustrating techniques for a variant synthesis process according to one or more example embodiments.

The tested variant dataset is used to generate the corresponding data frames for $A_2$. FIG. 5 shows an example of constructing gap data for $A_2$ using the tested variant dataset in accordance with example embodiments. In this example, the tested variant dataset includes two variants which are denoted $A_{i,1}$ and $A_{i,2}$. The transformation function (denoted 'f(x)' in FIG. 5) is applied to $A_{i,1}$ and $A_{2,1}$ to generate $A_{2,2}$ and $A_{2,2}$, respectively.

Each of the variants in the tested variant dataset and the corresponding generated data frames (for example, $A_{i,1}$ and $A_{2,1}$) are then used by mode extractor 108, anomalous state detector 110 and unsupervised anomalous asset detection 114 to determine whether both $A_{i,1}$ and $A_{2,1}$ are indeed flagged anomalous or not. If yes, then n(E∩I) for the corresponding rule is incremented.

The rules fitter 306 then uses rules discovered by the rules miner 302 and updated by the data gap filler 308 are used to make predictions on assets that were previously unmarked to estimate the propensity (i.e., rule probability). The user may be presented with a list of assets and corresponding propensity metric as output.

The knowledge graph 106 includes assets as vertices, and the edges between vertices are labeled by the relationship between the assets. For instance, label <i, j, depends> indicates that asset i depends on j. As a non-limiting example, asset i could correspond to a coolant pump and asset j could correspond to an air pump in an air-conditioning system.

Figure 6:
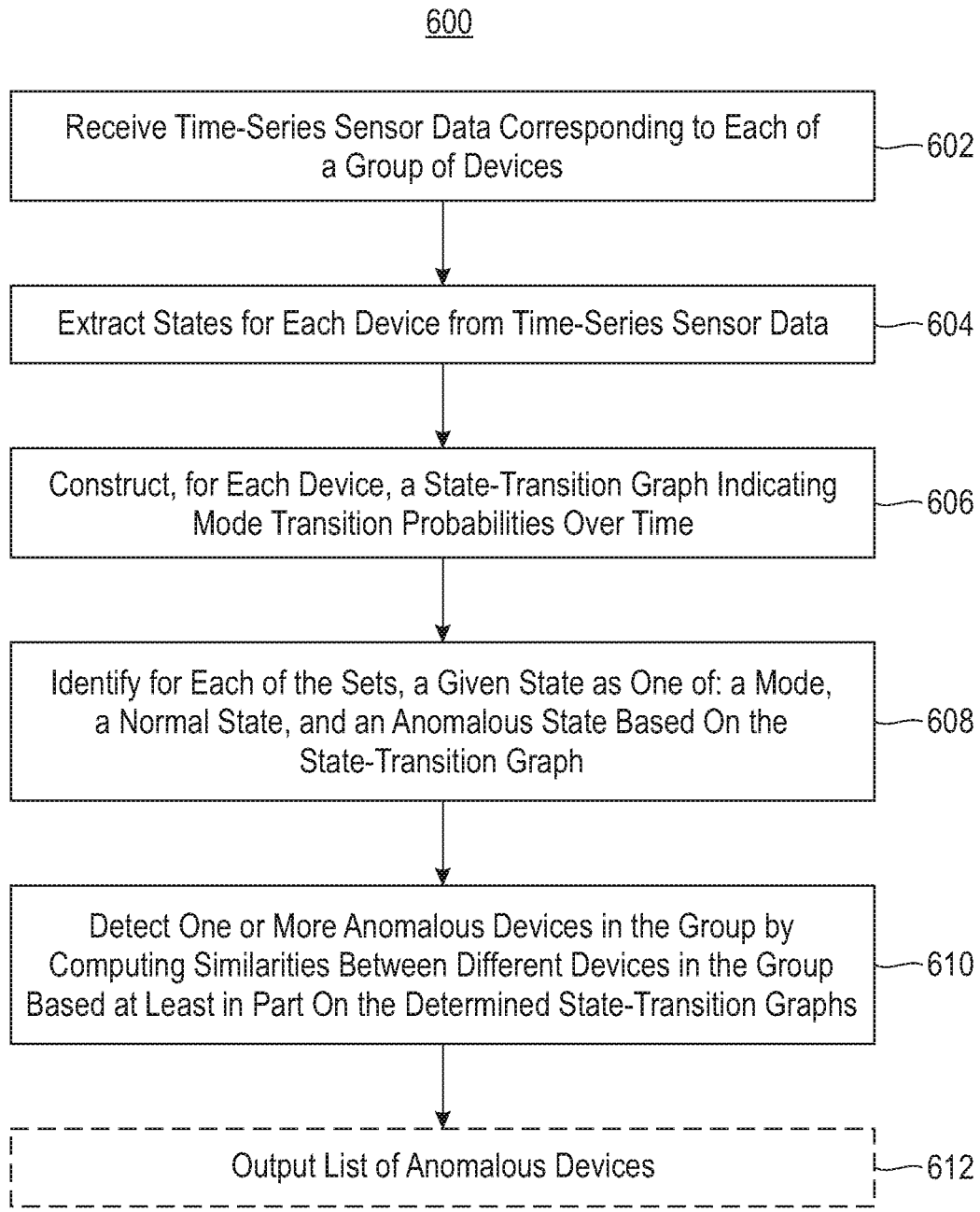
FIG. 6 is a flow diagram illustrating techniques according to an embodiment of the invention.

FIG. 6 is a flow diagram illustrating a process 600 according to an embodiment of the present invention. Step 602 of process 600 includes receiving time-series sensor data for each one of a group of devices. Step 604 includes extracting a set of states for each device in the group from the time-series sensor data. Step 606 includes constructing a state-transition graph for each of the devices, wherein each of the state-transition graphs comprises (i) nodes corresponding to each state in the set and (ii) edges corresponding to a probability of transition between the extracted states over time. Step 608 includes identifying, for each set, a given state as one of: a mode, a normal state and an anomalous state based on the state-transition graph. Step 610 includes detecting one or more anomalous devices in the group by computing similarities between different devices in the group, based at least in part on the determined state-transition graphs. Optionally, the process 600 comprises step 612 of outputting a list of the anomalous devices to a user.

The extracting may include, for each device: segmenting the time-series sensor data into a plurality of segments; fitting a multivariate distribution to the plurality of segments; computing similarities between the plurality of segments using said multivariate distribution; and applying unsupervised clustering to the computed similarities to extract the set of states for the device.

The step of identifying may include: determining the given state is a mode if the sum of the probabilities of all cycles for which the given state belongs exceeds a first threshold value, wherein the probability of each cycle is a product of all edge probabilities in that cycle; determining the given state is a normal state if (i) the sum of the probabilities of all cycles for which the given state belongs is less than the first threshold value, wherein the probability of each cycle is a product of all edge probabilities in that cycle and (ii) the self-transition probability of the given state is greater than a second threshold value; and otherwise determining the given state is an anomalous state.

Detecting one or more anomalous devices in the group may include: computing a steady-state probability vector for each of the state-transition graphs; and computing the similarities between different devices based at least in part on the steady-state probability vectors.

Computing the similarities between different devices may be based on at least one of (i) a KL-Divergence metric, (ii) a Dunn-index metric and (iii) a matrix norm metric.

Detecting one or more anomalous devices in the group may include constructing an asset-state similarity graph comprising (i) nodes corresponding to each device in the group and (ii) edges between the nodes indicating the computed similarity; and applying unsupervised graph clustering to the asset-state similarity graph to identify the one or more anomalous devices in the group.

The process 600 may include identifying one or more portions of the time-series sensor data for at least a first one of the devices are missing; and synthesizing data to fill in the one or more portions of missing data.

Synthesizing the data may include identifying, based on a knowledge graph, at least one other device in the group that is similar to the first device, wherein the at least one other device has already been detected as being an anomalous device, and wherein the knowledge graph comprises (i) nodes corresponding to the group of the devices and (ii) edges between the nodes indicating a device relationship between the devices; and synthesizing the data based at least in part on sensor data corresponding to the at least one other device.

Synthesizing the data may include applying a variant synthesis technique to produce different variants of the one or more portions of missing data.

The time-series sensor data corresponding to a given device in the group may include (i) a plurality of timestamps and (ii) one or more sensor values from at least one sensor of the given device.

The group of devices may correspond to at least a part of one or more of: (i) a heating system, (ii) a ventilation system, (iii) a cooling system and (iv) a turbine system.

Also, an additional embodiment of the invention includes a process including performing intra-asset anomaly detection for a group of devices based on sensor data related to each device in the group, wherein said intra-asset anomaly detection for a given device comprises (i) extracting one or more states for the given device from the sensor data and (ii) identifying each of the extracted states as being one of (a) a mode, (b) a normal state and (c) an anomalous state based at least in part on state transition probabilities from a state-transition matrix for the given device, wherein the state-transition matrix is determined based at least in part on the sensor data; and performing unsupervised inter-asset anomaly detection for the group of devices, wherein said inter-asset anomaly detection comprises detecting anomalous devices in the group based at least in part on a comparison of the state-transition matrices determined for each of the devices. The process may further include identifying one or more missing portions of sensor data related to at least a first one of the devices; identifying, based on a knowledge graph, at least one other device in the group that is similar to the first device, wherein the at least one other device has already been detected as being an anomalous device, and wherein the knowledge graph comprises (i) nodes corresponding to the group of the devices and (ii) edges between the nodes indicating a relationship between the devices; and synthesizing data based at least in part on the sensor data corresponding to the at least one other device; wherein performing said intra-asset anomaly detection is based at least in part on the synthesized data.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer usable program code that is stored in a computer readable storage medium in a data processing system, and wherein the computer usable program code was downloaded over a network from a remote data processing system. Also, in an embodiment of the invention, the computer program product can include computer usable program code that is stored in a computer readable storage medium in a server data processing system, and wherein the computer usable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 7:
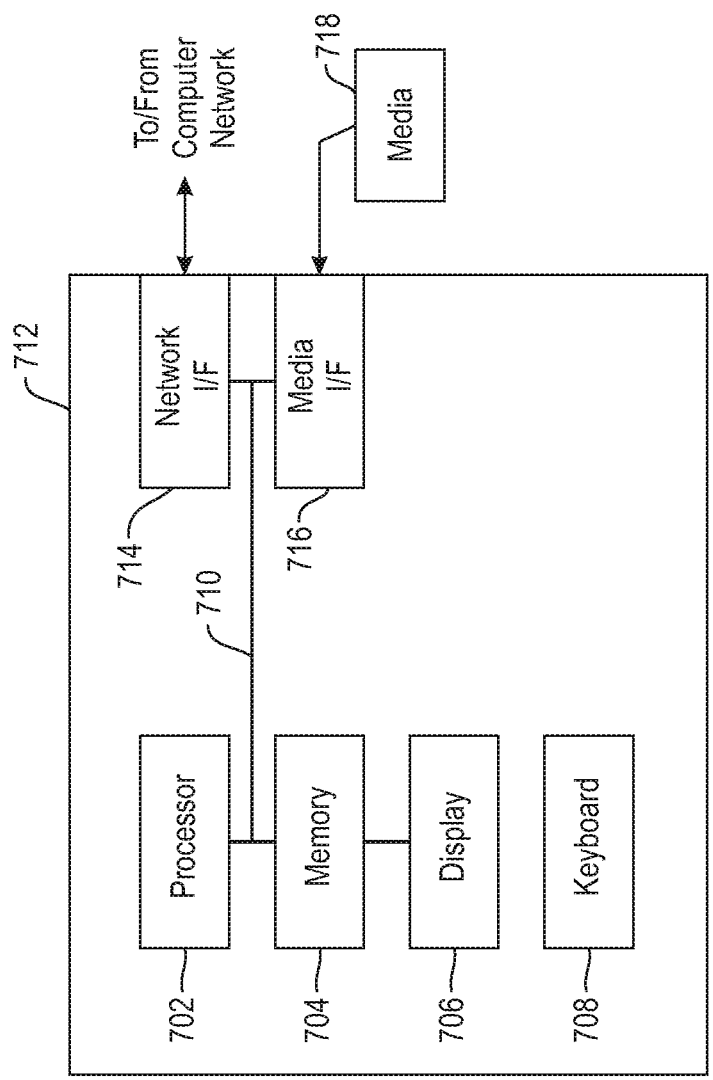
FIG. 7 is a system diagram of an exemplary computer system on which at least one embodiment of the invention can be implemented.

Additionally, an embodiment of the present invention can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
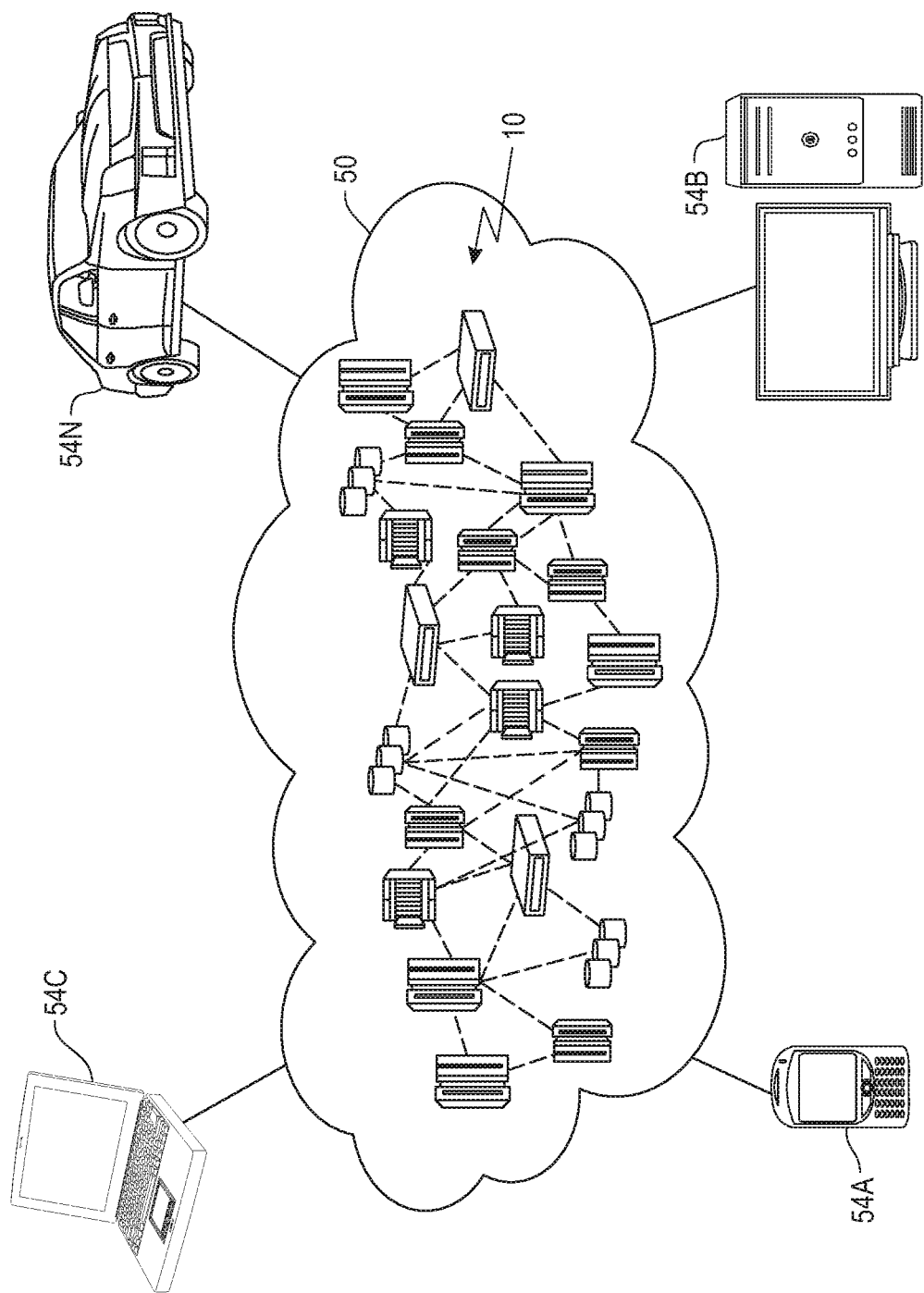
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
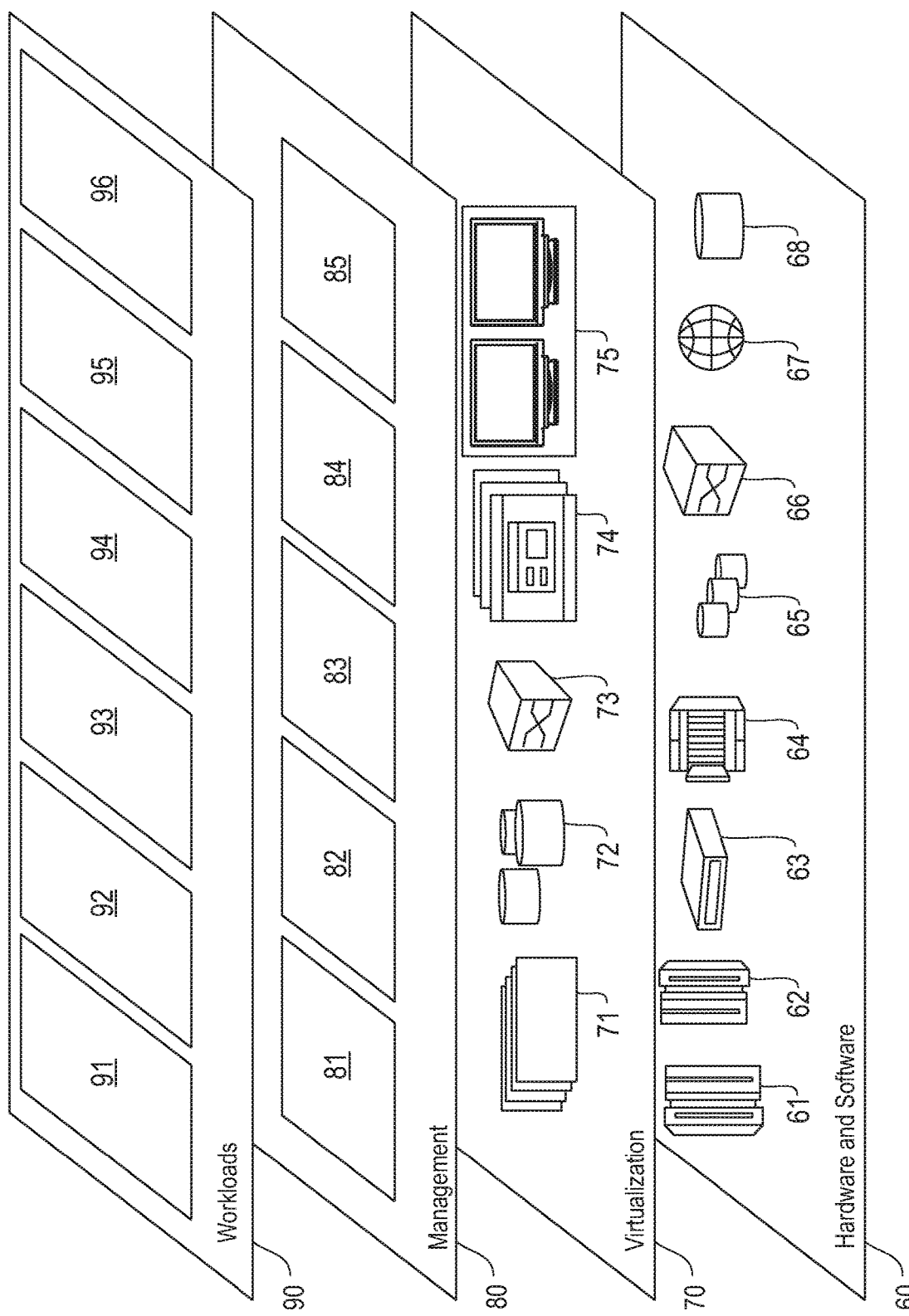
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, rapid inference of anomalies across multiple assets (such as IoT assets, for example) in an unsupervised manner based on a domain-agnostic definition of mode and anomalous mode. Also, at least one embodiment of the present invention may provide a beneficial effect such as, for example, inferring the propensity of an anomaly in assets even under conditions of incomplete data by, for example, leveraging asset relationships and using a knowledge graph.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising: receiving time-series sensor data for each one of a group of devices; extracting a set of states for each device in the group from the time-series sensor data; constructing a state-transition graph for each of the devices, wherein each of the state transition graphs comprises (i) nodes corresponding to each state in the set and (ii) edges corresponding to a probability of transition between the extracted states over time; identifying, for each set, a given state as one of (i) a mode, (ii) a normal state (iii) and an anomalous state based on the state-transition graph; and detecting one or more anomalous devices in the group by computing similarities between different devices in the group, based at least in part on the state-transition graphs, wherein said detecting comprises computing a steady-state probability vector for each of the state-transition graphs, and computing, using at least one of (i) a Kullback-Leibler (KL)-Divergence metric, (ii) a Dunn-index metric, and (iii) a matrix norm metric, the similarities between different devices based at least in part on the steady-state probability vectors; wherein the method is carried out by at least one computing device.

2. The computer-implemented method of claim 1, wherein said extracting comprises, for each device: segmenting the time-series sensor data into a plurality of segments; fitting a multivariate distribution to the plurality of segments; computing similarities between the plurality of segments using said multivariate distribution; and applying unsupervised clustering to the computed similarities to extract the set of states for the device.

3. The computer-implemented method of claim 2, wherein said identifying comprises: determining the given state is a mode if the sum of the probabilities of all cycles for which the given state belongs exceeds a first threshold value, wherein the probability of each cycle is a product of all edge probabilities in that cycle; determining the given state is a normal state if (i) the sum of the probabilities of all cycles for which the given state belongs is less than the first threshold value, wherein the probability of each cycle is a product of all edge probabilities in that cycle and (ii) the self-transition probability of the given state is greater than a second threshold value; and otherwise determining the given state is an anomalous state.

4. The computer-implemented method of claim 1, wherein said detecting comprises: constructing an asset-state similarity graph comprising (i) nodes corresponding to each device in the group and (ii) edges between the nodes indicating the computed similarity; and applying unsupervised graph clustering to the asset-state similarity graph to identify the one or more anomalous devices in the group.

5. The computer-implemented method of claim 1, comprising: identifying one or more portions of the time-series sensor data for at least a first one of the devices are missing; and synthesizing data to fill in the one or more portions of missing data.

6. The computer-implemented method of claim 5, wherein said synthesizing comprises: identifying, based on a knowledge graph, at least one other device in the group that is similar to the first device, wherein the at least one other device has already been detected as being an anomalous device, and wherein the knowledge graph comprises (i) nodes corresponding to the group of the devices and (ii) edges between the nodes indicating a device relationship between the devices; and synthesizing the data based at least in part on sensor data corresponding to the at least one other device.

7. The computer-implemented method of claim 5, wherein said synthesizing comprises: applying a variant synthesis technique to produce different variants of the one or more portions of missing data.

8. The computer-implemented method of claim 1, wherein the time-series sensor data for a given device in the group comprise (i) a plurality of time-stamps and (ii) one or more sensor values from at least one sensor of the given device.

9. The computer-implemented method of claim 1, comprising: outputting a list of the detected anomalous devices to a user.

10. The computer-implemented method of claim 1, wherein the group of devices corresponds to at least a part of one or more of: (i) a heating system, (ii) a ventilation system, (iii) a cooling system and (iv) a turbine system.

11. A computer readable storage medium having program instructions embodied therewith, the program instructions executable by a computing device to cause the computing device to perform at least: receiving time-series sensor data for each one of a group of devices; extracting a set of states for each device in the group from the time-series sensor data; constructing a state-transition graph for each of the devices, wherein each of the state-transition graphs comprises (i) nodes corresponding to each state in the set and (ii) edges corresponding to a probability of transition between the extracted states over time; identifying, for each set, a given state as one of (i) a mode, (ii) a normal state and (iii) an anomalous state based on the state-transition graph; and detecting one or more anomalous devices in the group by computing similarities between different devices in the group, based at least in part on the state-transition graphs, wherein said detecting comprises computing a steady-state probability vector for each of the state-transition graphs, and computing, using at least one of (i) a Kullback-Leibler (KL)-Divergence metric, (ii) a Dunn-index metric, and (iii) a matrix norm metric, the similarities between different devices based at least in part on the steady-state probability vectors.

12. The computer readable storage medium of claim 11, wherein said extracting comprises, for each device: segmenting the time-series sensor data into a plurality of segments; fitting a multivariate distribution to the plurality of segments; computing similarities between the plurality of segments using said multivariate distribution; and applying unsupervised clustering to the computed similarities to extract the set of states for the device.

13. The computer readable storage medium of claim 12, wherein said identifying comprises: determining the given state is a mode if the sum of the probabilities of all cycles for which the given state belongs exceeds a first threshold value, wherein the probability of each cycle is a product of all edge probabilities in that cycle; determining the given state is a normal state if (i) the sum of the probabilities of all cycles for which the given state belongs is less than the first threshold value, wherein the probability of each cycle is a product of all edge probabilities in that cycle and (ii) the self-transition probability of the given state is greater than a second threshold value; and otherwise determining the given state is an anomalous state.

14. The computer readable storage medium of claim 11, wherein the program instructions cause the computing device to perform at least: outputting a list of the detected anomalous devices to a user.

15. The computer readable storage medium of claim 11, wherein said detecting comprises: constructing an asset-state similarity graph comprising (i) nodes corresponding to each device in the group and (ii) edges between the nodes indicating the computed similarity; and applying unsupervised graph clustering to the asset-state similarity graph to identify the one or more anomalous devices in the group.

16. The computer readable storage medium of claim 11, wherein the program instructions cause the computing device to perform at least: identifying one or more portions of the time-series sensor data for at least a first one of the devices are missing; and synthesizing data to fill in the one or more portions of missing data.

17. The computer readable storage medium of claim 16, wherein said synthesizing comprises: identifying, based on a knowledge graph, at least one other device in the group that is similar to the first device, wherein the at least one other device has already been detected as being an anomalous device, and wherein the knowledge graph comprises (i) nodes corresponding to the group of the devices and (ii) edges between the nodes indicating a device relationship between the devices; and synthesizing the data based at least in part on sensor data corresponding to the at least one other device.

18. The computer readable storage medium of claim 16, wherein said synthesizing comprises: applying a variant synthesis technique to produce different variants of the one or more portions of missing data.

19. The computer readable storage medium of claim 11, wherein the devices in the group comprise internet-of-things devices.

20. A system comprising: a memory configured to store program instructions; and at least one processor operably coupled to the memory to execute the program instructions to: receive time-series sensor data for each one of a group of devices; extract a set of states for each device in the group from the time-series sensor data; construct a state-transition graph for each of the devices, wherein each of the state-transition graphs comprises (i) nodes corresponding to each state in the set and (ii) edges corresponding to a probability of transition between the extracted states over time; identify, for each set, a given state as one of (i) a mode, (ii) a normal state and (iii) an anomalous state based on the state-transition graph; and detect one or more anomalous devices in the group by computing similarities between different devices in the group, based at least in part on the state-transition graphs, wherein said detecting comprises computing a steady-state probability vector for each of the state-transition graphs, and computing, using at least one of (i) a Kullback-Leibler (KL)-Divergence metric, (H) a Dunn-index metric, and (iii) a matrix norm metric, the similarities between different devices based at least in part on the steady-state probability vectors.

* * * * *